(12) United States Patent
Goubard

(10) Patent No.: US 9,850,411 B2
(45) Date of Patent: Dec. 26, 2017

(54) USE OF AN ADHESIVE COMPOSITION TO PROVIDE A BONDING IN A WET ENVIRONMENT

(71) Applicant: BOSTIK SA, La Plaine Saint Denis (FR)

(72) Inventor: David Goubard, Compiegne (FR)

(73) Assignee: BOSTIK SA, La Plaine Saint Denis (FR)

( * ) Notice: Subject to any disclaimer, the term of this patent is extended or adjusted under 35 U.S.C. 154(b) by 410 days.

(21) Appl. No.: 14/413,138

(22) PCT Filed: Jul. 5, 2013

(86) PCT No.: PCT/EP2013/064284
§ 371 (c)(1),
(2) Date: Jan. 6, 2015

(87) PCT Pub. No.: WO2014/006189
PCT Pub. Date: Jan. 9, 2014

(65) Prior Publication Data
US 2015/0166858 A1    Jun. 18, 2015

(30) Foreign Application Priority Data

Jul. 6, 2012 (EP) .................................... 12305816

(51) Int. Cl.
*B29C 65/52* (2006.01)
*B29C 65/54* (2006.01)
(Continued)

(52) U.S. Cl.
CPC ............ *C09J 175/08* (2013.01); *B32B 37/12* (2013.01); *B32B 37/18* (2013.01); *C08G 18/10* (2013.01); *C08G 18/4825* (2013.01); *C08G 18/718* (2013.01); *C08G 18/755* (2013.01); *C08G 65/336* (2013.01); *C09J 7/0207* (2013.01); *C09J 171/02* (2013.01); *C09J 175/04* (2013.01); *C09J 201/10* (2013.01); *C09J 2400/22* (2013.01)

(58) Field of Classification Search
USPC ....... 156/230, 231, 232, 237, 238, 247, 249, 156/289, 307.1, 307.3, 307.5
See application file for complete search history.

(56) References Cited

U.S. PATENT DOCUMENTS 8,114,233 B2    2/2012  Stanjek
8,129,479 B2    3/2012  Ueda et al.
(Continued)

FOREIGN PATENT DOCUMENTS

DE    102006054155 A1    5/2008
EP       1715016 A1    10/2006
(Continued)

OTHER PUBLICATIONS

Machine translation of WO 2005/044888.*
International Search Report dated Oct. 2, 2013 issued in corresponding PCT/EP2013/064284 application (pp. 1-4).

*Primary Examiner* — Sing P Chan
(74) *Attorney, Agent, or Firm* — Millen, White, Zelano and Branigan, P.C.

(57) ABSTRACT

The invention relates to the use of an adhesive composition to provide a bonding in a wet environment. The invention also relates to a method for providing a bonding in a wet environment.

17 Claims, 3 Drawing Sheets

(51) Int. Cl.
*B32B 37/12* (2006.01)
*B32B 37/26* (2006.01)
*B32B 38/10* (2006.01)
*B32B 43/00* (2006.01)
*C09J 175/08* (2006.01)
*C09J 7/02* (2006.01)
*C09J 171/02* (2006.01)
*C09J 175/04* (2006.01)
*C09J 201/10* (2006.01)
*C08G 18/48* (2006.01)
*C08G 18/71* (2006.01)
*C08G 18/75* (2006.01)
*C08G 18/10* (2006.01)
*B32B 37/18* (2006.01)
*C08G 65/336* (2006.01)

(56) References Cited

U.S. PATENT DOCUMENTS

| | | |
|---|---|---|
| 8,648,162 B2 | 2/2014 | Yasuda et al. |
| 2007/0088137 A1* | 4/2007 | Georgeau ............ C08G 65/336 525/487 |
| 2007/0123662 A1 | 5/2007 | Ueda et al. |
| 2010/0078117 A1 | 4/2010 | Stanjek |
| 2011/0151250 A1 | 6/2011 | Yasuda et al. |
| 2011/0166285 A1 | 7/2011 | Zander et al. |
| 2013/0299074 A1 | 11/2013 | Chartrel et al. |

FOREIGN PATENT DOCUMENTS

| | | |
|---|---|---|
| EP | 2322583 A1 | 5/2011 |
| WO | 2005/044888 A1 | 5/2005 |
| WO | 2012/090151 A2 | 7/2012 |

* cited by examiner

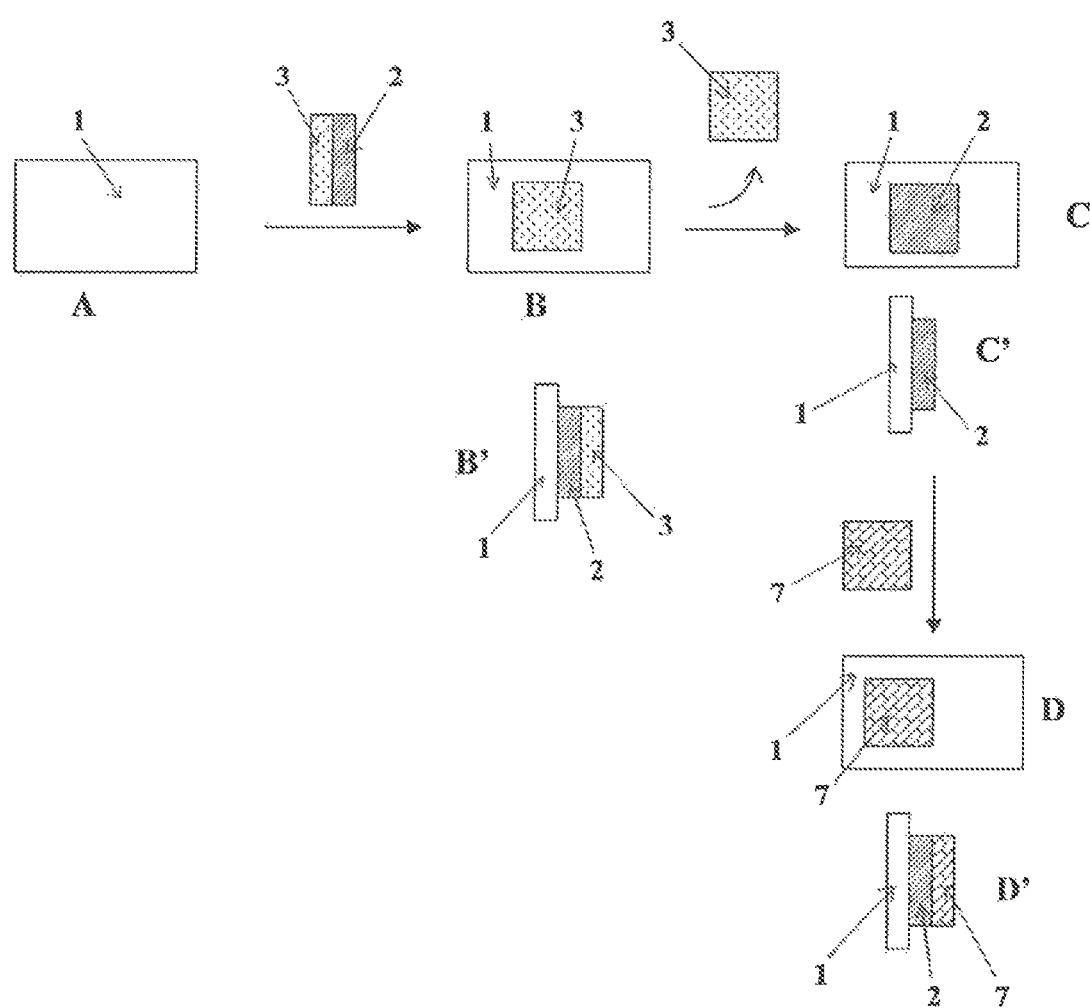

USE OF AN ADHESIVE COMPOSITION TO PROVIDE A BONDING IN A WET ENVIRONMENT

FIELD OF THE INVENTION

The invention relates to the use of an adhesive composition to provide a bonding in a wet environment. The invention also relates to a method for providing a bonding in a wet environment.

BACKGROUND OF THE INVENTION

Pressure-Sensitive Adhesives or PSAs are substances that give the substrate, also called carrier, coated therewith an immediate tack at room temperature, which allows its instantaneous adhesion to a surface under the effect of brief slight pressure.

The substrate can be constituted of paper or a film of polymer material having one or more layers. The adhesive layer that covers the substrate may itself be covered with a protective non-sticking layer (often called a "release liner"), for example composed of a siliconized film. An option is to have a non-sticking layer or face directly existing/created on the back of the substrate. This is the common configuration when we talk about tape. Thanks to the back-side non-sticking layer, the substrate coated with the adhesive layer may be wound up without any sticking problem resulting from the contact of the back side of the substrate and the adhesive layer. For example, the substrate may be a release liner having on both sides, a non-sticking layer or face. In this configuration, the substrate is used in order to produce and transport the self-adhesive article since the substrate is coated with the adhesive layer, and the coated substrate may be wound up and unwounded. Then, after unwounding the adhesive article, a substrate bearing the adhesive layer is obtained. After application of the self-adhesive layer onto a surface to be bonded, the substrate is removed and the bonded article comprises only the adhesive layer, without any substrate. This is the common configuration when we talk about "transfer tape". The multilayer system obtained is generally packaged by being wound up in the form of large reels up to 2 m in width and 1 m in diameter, which can be stored and transported.

Generally, PSAs are based on adhesive compositions in a solvent phase. Those solvents aim at improving mixing, dosing or pumping of those adhesives during their production but also at facilitating their coating in thin layer, which after solvent evaporation will be a self-adhesive layer. Nevertheless, the use of solvents is subjected to stricter and stricter regulations.

More recently, water-based adhesives have been developed. In this case, the problems related to solvents are solved but a problem related to the evaporation step persists. Indeed, the energy necessary to evaporate water from the coated adhesive composition is very high; thus, the process is not satisfying with regards to energy demand, therefore it is dissatisfying from an environmental point of view.

Even more recently, adhesives based on solvent-free technologies have been developed. Those adhesives are named "Hot-Melt Pressure-Sensitive Adhesives" (HMPSA). HMPSAs generally comprise a thermoplastic polymer, in particular elastomeric block copolymers, usually in combination with tackifying resins and plasticizers.

Some applications require a pressure-sensitive adhesive article that can be used to provide a bonding in wet environments, such as a wet atmosphere, like under-water. Some applications require a pressure-sensitive adhesive article that can be bonded to a wet surface.

Among such applications mention may be made of:
medical applications, such as bandage, blisters, wound dressing, electrode pads, plasters, etc
clothing applications, such as clothing dealing with wet weather or with under-water activities,
masking films, lettering, decals, graphic arts PSA films, PSA plotted articles,
building applications, especially in areas where the climate is humid, also for buildings or building parts in frequent or permanent water environment, such as bridges, roofings, wall coverings, water towers, manufacturing plants, swamp areas, water treatment centers, aquatic activity centers, bathrooms, kitchens, etc
bonding applications for transport where parts of vehicles are regularly or permanently exposed to wet environments, like for making or repairing individual cars, buses, trucks, professional vehicles, boats, ships, cargos.
transportation of gas or liquid, such as pipes.

As wet environment, mention may be made of natural water, stagnant or flowing water, sea water, rain water, detergent aqueous composition, disinfectant aqueous composition, specifically compounded water for any purpose such as swimming-pool water, sewage water, fire extinguishing water, cooling water for any equipment or machine running with gas, oil or electricity.

Body fluids can also be considered as a wet environment since they contain a significant amount of water. Mention may be made of sweat, saliva, blood, urine, feces, and lymphatic fluids.

As a wet surface, mention may be made of skin surface, surfaces present in humid areas, such as a roof, a bathroom or a kitchen or any surface present in an area where the climate is humid.

The bonding can be a permanent or a removable bonding; it can have a high grab or a low tack; it can have a high shear resistance or not. The bonding can need to resist with the passage of time.

Some applications require a bonding characterized by a high peel strength, for example higher than 5 N/cm whereas other applications require a bonding characterized by a lower peel strength, for example comprises between 0.75 and 5 N/cm, preferably between 0.80 and 5 N/cm, more preferably between 0.90 and 1 N/cm, still more preferably between 1 and 5 N/cm.

Document U.S. Pat. No. 6,296,730 describes an adhesive composition suitable for use in an aqueous environment. The adhesive composition comprises a resin-plasticizer modified acrylonitrile-butadiene elastomer, dissolved in low-toxicity solvent.

Document U.S. Pat. No. 8,028,353 describes a foam device for use in a swimming pool. The foam comprises an adhesive layer selected from hot-melt adhesive, solvent-based adhesive, water-based adhesive or UV-cured polymer.

Document EP 1 715 015 describes a pressure sensitive adhesive composition comprising an oxyalkylene polymer containing 0.3 to 0.7 equivalent of a hydrolysable silyl group per molecule, a tackifier resin and a curing catalyst.

Document US 2010/0147443 describes an adhesive tape having at least one adhesive layer wherein at least one polymer layer comprises a foaming agent allowing the formation of a water barrier. Said adhesive layers are prepared from solvent-based polymers.

Document US 2011/0166285 describes a composition comprising 10-50% of silane-group terminated polymers, 0.5-20% by weight of (meth)acrylate block copolymers, 85-40% by weight of fillers and auxiliaries agent. Said composition is different from the composition according to the present invention. Additionally, the very high amount of fillers leads to a composition in the form of a putty, which is not the aim of the present invention.

Document WO 2005/044888 describes an adhesive molded body comprising silyl-containing polyurethane. The compositions described in document WO 2005/044888 are different from the compositions according to the present invention. Additionally, the method of bonding is different. Indeed, said molded body adheres to a surface thanks to the application of pressure which releases the uncured core of the body in order to perform the curing and the bonding simultaneously.

Document WO 2009/106699 describes a heat-cross-linkable adhesive composition based on a polyurethane comprising two alkoxysilane-type end groups.

Document EP 2 336 208 describes a heat-cross-linkable adhesive composition, said composition being based on a polyether comprising two hydrolysable alkoxysilane-type end groups.

Documents WO 2009/106699 and EP 2 336 208 do not mention or suggest that the adhesive composition can be used to provide a bonding in a wet environment.

SUMMARY OF THE INVENTION

A first object of the invention is the use of an adhesive composition comprising:
 a) from 20 to 85% by weight of at least one silyl-containing polymer selected from:
  i) a silyl-containing polyether having from 1.9 to 2.1 silyl functions per molecule,
  ii) a silyl-containing polyurethane,
  iii) a silyl-containing polyurethane having polyurethane-polyether and polyurethane-polyester blocks, and mixtures thereof,
 b) from 25 to 80% by weight of at least one compatible tackifying resin and
 c) from 0.01 to 3% by weight of at least one catalyst,
 d) less than 5% by weight of solvent,
based on the total weight of the adhesive composition, for bonding at least one surface to at least one article in a wet environment.

Preferably, bonding in a wet environment is chosen from:
Bonding at least one surface having a humidity level higher than or equal to 5%,
Bonding at least one surface covered with a layer of aqueous medium,
Bonding at least one surface in an atmosphere characterized by at least 20% relative humidity.

According to one embodiment of the invention, the adhesive composition is used to bond a self-adhesive article comprising at least one substrate and an adhesive layer onto the surface, wherein said adhesive layer is obtained by curing the adhesive composition.

Preferably, in the adhesive composition, at least 90% by weight of the silyl-containing polymers are selected from silyl-containing polyethers having from 1.9 to 2.1 silyl functions per molecule, silyl-containing polyurethanes, silyl-containing polyurethanes having polyurethane-polyether and polyurethane-polyester blocks, and mixtures thereof.

According to one embodiment of the invention, the tackifying resin is selected from phenol modified terpene resins, hydrocarbon resins, rosin ester resins, acrylic resins and mixtures thereof.

According to one embodiment of the invention, the substrate is a protective non-sticking layer, preferably a siliconized film.

According to one embodiment of the invention, the wet environment is chosen from natural water, stagnant or flowing water, sea water, rain water, swamp area, specifically compounded water for any purpose such as swimming-pool water, sewage water, fire extinguishing water, cooling water for any equipment or machine running with gas, oil or electricity, a detergent aqueous composition, a disinfectant aqueous composition, body fluids, such as sweat, saliva, blood, urine, feces or lymphatic fluids.

According to one embodiment of the invention, the wet surface is chosen from a skin surface, a bathroom or kitchen equipment surface, a piping, a pipe, an aquatic article, a boat hull, a roof, a bridge, a wall covering.

According to one embodiment of the invention, the adhesive composition is used to repair objects, and/or to prevent and/or repair leaks, and/or to reinforce a surface of an object, and/or to create a multilayer article, and/or to superpose layers in an adhesive manner.

Another object of the invention is a method for bonding a self-adhesive article comprising at least one substrate and an adhesive layer onto a surface, said adhesive layer being obtained by curing the adhesive composition as previously disclosed, said method comprising the steps of:
 a) removing the protective non-sticking layer when said layer is present;
 b) applying the article onto the surface; and
 c) applying a pressure onto the article;
wherein at least one of steps a), b) or c) is carried out in a wet environment or wherein the method includes an additional step d) of contacting the surface bonded with the article, with a wet environment According to one embodiment of the invention, at least one of steps a), b) or c) is carried out under water, preferably under sea water.

According to one embodiment of the method for bonding, the surface is chosen from a surface having a humidity level higher than or equal to 5%, and a surface covered with a layer of aqueous medium, and/or the wet environment is an atmosphere characterized by at least 20% relative humidity.

Another object of the invention is a method for repairing objects, and/or for preventing and/or repairing leaks, and/or for reinforcing a surface of an object, and/or for creating a multilayer article, and/or for superposing layers in an adhesive manner, wherein it includes a method for bonding a self-adhesive article onto a surface according to the invention.

Preferably, applying the pressure onto the article substantially removes any water and/or air molecules which are trapped between the surface and the adhesive layer of the article.

According to one embodiment of the invention, the bonding is characterized by a peel strength which does not decrease with the passage of time, preferably which increases with the passage of time.

An advantage of the present invention is to provide an adhesive composition that can be used to provide a bonding in a wet environment and/or to provide a bonding which is resistant to a wet environment.

Another advantage of the present invention is to provide an adhesive composition without a significant amount of solvent that can be used to provide a bonding in a wet environment.

Another advantage of the present invention is to provide a self-adhesive article having a peel strength higher than 0.75 N/cm, preferably higher than 0.80 N/cm, more preferably higher than 0.90 N/cm, still more preferably higher than 1 N/cm, and that can be used to provide a bonding in a wet environment.

Another advantage of the present invention is to provide a long-lasting bonding, even in a wet environment.

Another advantage of the present invention is to provide a self-adhesive article having a peel strength which increases with the passage of bonding time, even in a wet environment.

Further features and advantages of the invention will appear from the following description of embodiments of the invention, given as non-limiting examples, with reference to the accompanying drawings listed hereunder.

BRIEF DESCRIPTION OF THE FIGURES

FIG. 4 is a schematic illustration of another embodiment of the invention wherein two surfaces are bonded.

DETAILED DESCRIPTION OF THE INVENTION

Figure 1:
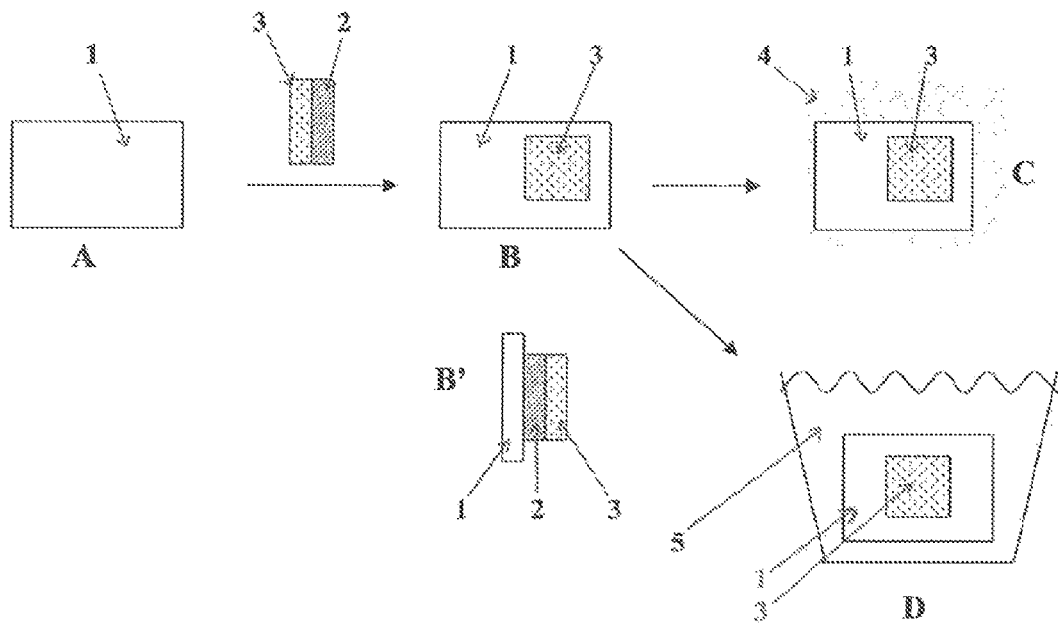
FIG. 1 is a schematic illustration of one embodiment of the invention.

A first object of the present invention is the use of an adhesive composition comprising at least one silyl-containing polymer, at least one compatible tackifying resin and at least one catalyst, for bonding a surface to an article in a wet environment.

According to one embodiment, the adhesive composition consists essentially of at least one silyl-containing polymer selected from polymers which are detailed here-under, at least one compatible tackifying resin and at least one catalyst.

According to one embodiment, the adhesive composition is used to bond at least two surfaces of at least two objects.

According to the present invention, by "bonding", it is also meant "adhering", "gluing", "adhesive bonding" or "fixing by an adhesive".

The expression "for bonding a surface to an article in a wet environment" includes either:
  a method of bonding comprising the following steps, at least one of said steps being carried out in a wet environment:
    removing the protective non-sticking layer when said layer is present
    applying the article onto a surface to be bonded,
    applying a pressure onto the article,
  or
  a method of bonding comprising the following steps:
    removing the protective non-sticking layer when said layer is present, said step not being performed in a wet environment;
    applying the article onto a surface to be bonded, said step not being performed in a wet environment;
    applying a pressure onto the article, said step not being performed in a wet environment, then
    contacting the surface bonded with the adhesive layer with a wet environment.

According to one embodiment, the wet environment is chosen from a wet surface and a wet atmosphere.

By "wet atmosphere", it is to be understood an atmosphere characterized by at least 20% relative humidity. According to a variant, it is an atmosphere in which at least 50% of the molecules are water molecules.

The humidity level or relative humidity is expressed as the percentage of water by volume, which corresponds to the number of molecules of water divided by the total number of molecules in a volume unit. Because of the linear nature of this scale, the humidity level is easy to display and regulate using normal set point P.I.D. (Proportional-Integral-Derivative) controllers. Percentage in weight can be calculated with normal air considering multiplying the percentage of water molecules based on the total number of molecules by a factor of 0.622. Academic and general information about humidity level in various environments is described by W. Wagner et al., in "*International Steam Tables—Properties of Water and Steam based on the Industrial Formulation IAPWS-IF97*".

By "wet surface", it is to be understood a surface which is inherently humid or a surface which is at least partially impregnated or coated with an aqueous medium.

By surface which is at least partially impregnated with an aqueous medium, it is to be understood that the material of which is made this surface comprises at least 5% by weight of water, advantageously at least 10% by weight of water, preferably at least 20% by weight of water, more preferably at least 50% by weight of water.

By surface which is at least partially coated with an aqueous medium, it is to be understood that the surface is covered with a layer of aqueous medium. According to this embodiment, the surface may be waterproof or not. The layer of aqueous medium may have a thickness of about 1 micron or more.

Among aqueous media, mention may be made of water such as natural water, sea water or rain water, body fluids such as sweat, saliva, blood, urine, feces or lymphatic fluids.

Among wet surfaces, can be mentioned human, animal or vegetal skin surfaces, bathroom or kitchen equipment surfaces, pipings, pipes, aquatic surfaces, boat hulls, roofs, bridges, wall coverings, vehicles.

The wet atmosphere is an atmosphere in which at least 20% of the molecules are water molecules, better at least 30%, even better at least 50%, preferably at least 70% of the molecules are water molecules, more preferably at least 90% of the molecules are water molecules.

According to one embodiment, the wet atmosphere is an atmosphere in which nearly 100% of the molecules are water molecules.

According to one embodiment, the wet atmosphere is chosen from natural water, stagnant or flowing water, sea water, rain water, swamp area, specifically compounded water for any purpose such as swimming-pool water, sewage water, fire extinguishing water, cooling water for any equipment or machine running with gas, oil or electricity, an aqueous detergent composition, an aqueous disinfectant composition, body fluids, such as sweat, saliva, blood, urine, feces or lymphatic fluids.

According to one embodiment, the adhesive composition is used for bonding a self-adhesive article comprising at least one substrate and an adhesive layer, obtained by curing the adhesive composition, to a surface of another object.

As used herein, the term "self-adhesive article" is meant to include any article which can be bonded onto a surface only by the action of a pressure with the hand or with an equipment, without the use of additional adhesives. By "self-adhesive article" is also to be understood a Pressure Sensitive Adhesive article. Those articles aim at exposing a PSA surface for use of sticking to other surfaces for closing, maintaining, fastening, or simply immobilizing, exposing forms, logos, pictures or information. Those articles can be used in many fields, such as medical, clothing, packaging, automobile or construction fields. They can be shaped according to their final application, for example in the form of tapes, such as industrial tape, DIY tape, single or double side tape, double side tape made out of single or multiple or no substrate, tape made with specific substrates like open or closed cells foams, grids or composite or textile or extruded or laminated webs, or in the form of labels, bandages, wound dressing, blisters, electrode pads, plasters, patches, PSA coated thick pad, road marking tapes or labels, graphic art PSA films.

The substrate may be a permanent substrate or a removable substrate. In the case where the substrate is a removable substrate, the substrate is preferably a protective non-sticking layer, also called a release liner.

In the case where the article comprises removable substrate(s) (called release liner(s)), once bonded onto a surface, the bonded article only comprises an adhesive layer. This configuration is often used to make double-side tapes.

The self-adhesive article comprises an adhesive layer that can be found onto one side or onto both sides of the substrate. In the case where both sides of the substrate are coated with the cured adhesive composition, the adhesive composition may be the same or different onto both sides, and at least one side is coated with the adhesive composition according to the invention.

The self-adhesive article may be in the form of a label, a tape, a patch or a bandage.

According to one embodiment of the invention, the adhesive composition is used to repair objects, for example, objects having a hole or a crack or rip. The adhesive composition may also be used for plant grafting or to treat injuries of a human or an animal.

According to one embodiment of the invention, the adhesive composition is used to prevent or repair leaks. The leak may be a gas or a liquid leak. The adhesive composition may also be used to reinforce a surface of an object, like a pipe or a piping.

According to one embodiment of the invention, the adhesive composition is used to superpose layers in an adhesive manner, for example to create a multilayer article.

Some embodiments of the invention are illustrated in FIGS. 1 to 4.

In FIG. 1, the adhesive article comprising the adhesive composition 2 and the substrate 3 is applied onto the surface 1 in a dry environment. We obtained the bonded surface illustrated by scheme B seen in a front view or by scheme B' seen in a profile view where we can observe the layers 1, 2 and 3. Then, the bonded surface is placed in a wet atmosphere 4 as illustrated by scheme C or under water 5 as illustrated by scheme D.

Figure 2:
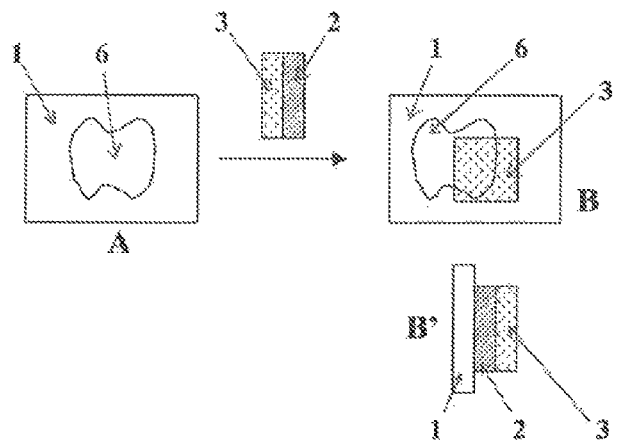
FIG. 2 is a schematic illustration of another embodiment of the invention.

According to one embodiment, the surface to be bonded is a wet surface and the atmosphere may be a dry or a wet atmosphere. In FIG. 2, the surface 1 to be bonded is a wet surface illustrated by the presence of a layer of water 6. The self-adhesive article comprising an adhesive composition 2 and a substrate 3 is applied onto the surface 1. Water 6 is expelled by the application of a pressure onto the article. The bonded surface is illustrated by schemes B and B', respectively in a front and in a profile view.

Figure 3:
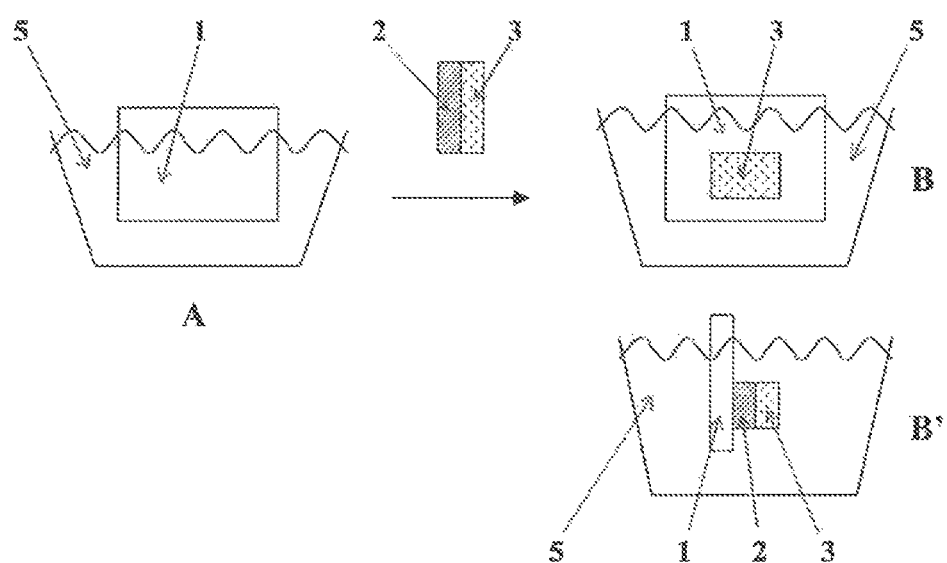
FIG. 3 is a schematic illustration of another embodiment of the invention.

According to one embodiment, the surface to be bonded is in a wet atmosphere, for example, the surface may be immersed in a liquid, such as water. In FIG. 3, the surface 1 to be bonded is already in a wet environment, for example immersed in water 5 (scheme A). The self-adhesive article comprising an adhesive composition 2 and a substrate 3 is applied onto the surface 1. The bonding is carried out in the wet environment, here illustrated by an immersion in water. After the bonding, we obtained a bonded surface illustrated by schemes B and B', respectively in a front view and in a profile view.

According to one embodiment, the substrate included in the article is a release liner which is conceived to be removed during the application of the article.

FIG. 4 illustrates one embodiment of the invention in which the substrate 3 is a release liner. At least one of the steps described in FIG. 4 is carried out in a wet environment. For example, the surface 1 may be a wet surface or the surface 7 may be a wet surface (cases illustrated by FIG. 2) and/or the bonding may be carried out in a wet atmosphere (case illustrated by FIG. 3) or the bonded surfaces may then be placed in a wet environment (case illustrated by FIG. 1).

In FIG. 4, the self-adhesive article comprising the adhesive layer 2 and a substrate 3 is applied onto a surface 1 to obtain the bonded surface illustrated by scheme B in a front view and by scheme B' in a profile view. Then, the substrate 3 which is a release liner is removed from the adhesive layer and we obtain the adhesive layer 2 bonded to the surface 1 (scheme C in a front view and scheme C' in a profile view). Then, a second surface 7 is bonded to the assembly of scheme C (or C') thanks to the adhesive layer 2 and we obtained two bonded surfaces 1 and 7 illustrated by scheme D in a front view and by scheme D' in a profile view.

The embodiment illustrated by FIG. 4 may be carried out in many fields of applications, such as in the car industry or in the building industry, for examples for mounting wood panels, carpets or plinths. Indeed, in this embodiment, before bonding, the article comprises an adhesive layer and a release liner and after application, the article only comprises an adhesive layer. The bonded article is thus present between two surfaces.

The adhesive layer is the cured adhesive composition. By "curing" it is to be understood "cross-linking", at a molar ratio that is sufficient to provide requested functions in specific conditions of use.

According to one embodiment, the adhesive composition comprises:
   from 20 to 85% by weight, preferably from 30 to 75% by weight of at least one silyl-containing polymer,
   from 25 to 80% by weight, preferably from 25 to 70% by weight of at least one tackifying resin,
   from 0.01 to 3% by weight, preferably from 0.1 to 2% by weight of at least one catalyst.

According to one embodiment, the adhesive composition consists essentially of:
   from 20 to 85% by weight, preferably from 30 to 75% by weight of at least one silyl-containing polymer,
   from 25 to 80% by weight, preferably from 25 to 70% by weight of at least one tackifying resin,
   from 0.01 to 3% by weight, preferably from 0.1 to 2% by weight of at least one catalyst.

The adhesive composition comprises less than 5% by weight of solvent, preferably less than 3% by weight of solvent, more preferably less than 1% by weight of solvent, even more preferably less than 0.5% by weight.

By "solvent", it is to be understood, a solvent having a boiling point ranging from 20 to 150° C.

The solvent may be present in the silyl-containing polymer.

Preferably, the adhesive composition comprises less than 5% by weight of volatile organic solvent. Among volatile organic solvents, mention may be made of low boiling point hydrocarbons, ketones, alcohols or esters.

The low amount of solvent allows providing adhesive compositions that can be made and/or used safely by the manufacturer or the user and that can satisfy the regulation on the use of solvents which is very strict, notably because of environmental problems.

The adhesive composition as previously described is preferably applied at temperatures superior or equal to 30° C., preferably superior or equal to 70° C., more preferably superior or equal to 90° C. with no significant quantity of solvent (typically inferior or equal to 5% by weight based on the total weight of the material). Said adhesive composition preferably comprises at least 5% by weight of an oligomer or a polymer or a large molecule with an average molecular weight ranging from 100 to 250,000 g/mol, preferably from 200 to 80,000 g/mol, more preferably from 500 to 60,000 g/mol and a chemical structure comprising from 0.01 to 4 mol/kg, preferably from 0.1 to 3.5 mol/kg of silylated functions.

According to one embodiment of the invention, the adhesive layer, after at least partially curing the silylated functions, has a loop tack representing a PSA behaviour of minimum of 0.75 N/cm, preferably of 0.80 N/cm, more preferably of 0.90 N/cm, still more preferably of 1 N/cm, preferably with no residues, on glass plate.

According to an embodiment of the invention, the adhesive layer as previously described may have a loop tack of at least 5 N/cm, preferably of at least 6 N/cm, more preferably of at least 7 N/cm, still more preferably of at least 8 N/cm. According to an embodiment, the adhesive composition according to the invention may have a loop tack comprised between 0.75 and 8 N/cm, preferably between 0.80 and 7 N/cm, more preferably between 0.90 and 6 N/cm, still more preferably between 1 and 5 N/cm. Said loop tack values may be achieved immediately after bonding the article onto a surface and/or after several hours after bonding the article onto a surface and/or after several days after bonding the article onto a surface.

According to one embodiment of the invention, the adhesive composition consists essentially of:
a) from 20 to 85% by weight of at least one silyl-containing polymer selected from:
  i) a silyl-containing polyether having from 1.9 to 2.1 silyl group per molecule,
  ii) a silyl-containing polyurethane,
  iii) a silyl-containing polyurethane having polyurethane-polyether and polyurethane-polyester blocks, and mixtures thereof,
b) from 25 to 80% by weight of at least one compatible tackifying resin and
c) from 0.01 to 3% by weight of at least one catalyst,
d) less than 5% by weight of solvent,
based on the total weight of the adhesive composition.

Silyl-Containing Polymer

The polymer is a silyl-containing polymer with no significant quantity of solvent, typically inferior or equal to 5% by weight based on the total weight of the material. By "silyl-containing polymer" is meant an oligomer or a polymer or a large molecule with an average molecular weight ranging from 100 to 250,000 g/mol, preferably from 200 to 80,000 g/mol, more preferably from 500 to 60,000 g/mol and having a chemical structure comprising from 0.1 to 4 mol/kg of silylated functions. Said silylated functions can be grafted at the extremities of the polymer or at any part of the polymer chain. By "silylated functions" is meant a function having the following formula (I):

$$-Si(R^4)_p(OR^5)_{3-p} \qquad (I)$$

wherein:

$R^4$ and $R^5$, which are identical or different, each represent a linear or branched alkyl radical having 1 to 4 carbon atoms, with the possibility, when there are several $R^4$ (or $R^5$) radicals, that these are identical or different, p is an integer equal to 0, 1 or 2.

The molecular weight is measured according to methods well-known for one of ordinary skills in the art, such as by Gel-Permeation Chromatography (GPC) using a calibration with Polystyrene Standards.

According to one embodiment of the invention, the silyl-containing polymer is selected from a silyl-containing polyether, a silyl-containing polyurethane, a silyl-containing polyurethane having polyurethane-polyether and polyurethane-polyester blocks, and mixtures thereof.

Preferably, the silyl-containing polyether comprises from 1.9 to 2.1 silyl functions per molecule, preferably from 1.95 to 2.05 silyl functions per molecule, ideally 2 silyl functions per molecule.

Preferably, the silyl-containing polyurethane comprises from 1.9 to 2.1 silyl functions per molecule, preferably from 1.95 to 2.05 silyl functions per molecule, ideally about 2 silyl functions per molecule.

Preferably, the silyl-containing polyurethane having polyurethane-polyether and polyurethane-polyester blocks comprises from 1.9 to 2.1 silyl functions per molecule, preferably from 1.95 to 2.05 silyl functions per molecule, ideally about 2 silyl functions per molecule.

According to a favourite variant, in the adhesive composition of the invention, at least 90% by weight, preferably at least 95% by weight, more preferably at least 98% by weight, of the silyl-containing polymers are selected from silyl-containing polyethers having from 1.9 to 2.1 silyl functions per molecule, silyl-containing polyurethanes, silyl-containing polyurethanes having polyurethane-polyether and polyurethane-polyester blocks, and mixtures thereof. Even more preferably, the silyl-containing polymers of the adhesive composition are exclusively selected from silyl-containing polyethers having from 1.9 to 2.1 silyl functions per molecule, silyl-containing polyurethanes, silyl-containing polyurethanes having polyurethane-polyether and polyurethane-polyester blocks, and mixtures thereof.

According to one embodiment, the adhesive composition is of the type described in documents WO 2009/106699 or EP 2 336 208.

Silyl-Containing Polyurethane (P4) Described in WO 2009/106699

According to one embodiment, the adhesive composition comprises a silyl-containing polyurethane (P4) having the following formula (II):

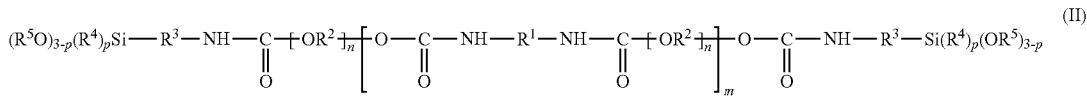

(II)

wherein:

R¹ represents a hydrocarbon-based divalent radical comprising from 5 to 15 carbon atoms which may be aromatic or aliphatic, linear, branched or cyclic, R² represents a linear or branched alkylene divalent radical comprising from 1 to 4 carbon atoms, R³ represents a linear alkylene divalent radical comprising from 1 to 3 carbon atoms, R⁴ and R⁵, which are identical or different, each represent a linear or branched alkyl radical having 1 to 4 carbon atoms, with the possibility, when there are several R⁴ (or R⁵) radicals, that these are identical or different, n is an integer such that the number-average molecular weight of the polyether block of formula —[OR²]n- is between 300 Da and 30 kDa, m is an integer such that the number-average molecular weight of the polymer of formula (II) is between 600 Da and 60 kDa;

p is an integer equal to 0, 1 or 2.

Silyl-Containing Polyether (P3) Described in EP 2 336 208

According to another embodiment, the adhesive composition comprises a silyl-containing polyether (P3) having the following formula (III):

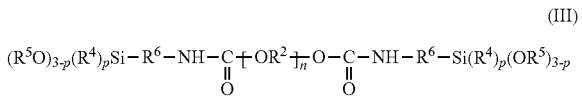

(III)

wherein:

R² represents a linear or branched alkylene divalent radical comprising from 1 to 4 carbon atoms, R⁶ represents a linear alkylene divalent radical comprising from 1 to 6 carbon atoms, R⁴ and R⁵, which are identical or different, each represent a linear or branched alkyl radical having 1 to 4 carbon atoms, with the possibility, when there are several R⁴ (or R⁵) radicals, that these are identical or different, n is an integer such that the number average molecular weight of the polymer of formula (III) is between 20 kDa and 40 kDa, p is an integer equal to 0, 1 or 2.

Silyl-Containing Polyurethane (P1)

According to one embodiment, the silyl-containing polymer is a silyl-containing polyurethane (P1) obtained by the following process:

a1) reaction of a mixture of alcohols comprising a polyether polyol (A1) with a stoechiometric excess of diisocyanate (B1), in order to form a polyurethane-polyether block (C1) having at least two terminal —NCO groups; then b1) reaction between the product (C1) obtained at the preceding step with a stoechiometric or a slight excess quantity of an alpha, beta or gamma-aminosilane (D1).

Furthermore, during the second step b1), the aminosilane (D1) reacts, according to a quantitative reaction, with the residual quantity of diisocyanate (C) remaining at the end of the first step a1), in order to form the silane derivative of said isocyanate. Said derivative contributes to the cross-linking reaction of the silyl-containing polymer. Said derivative reacts with the silyl-containing polymer to make three-dimensional network having siloxane links.

Silyl-Containing Polyurethane (P2) having Polyurethane-Polyether and Polyurethane-Polyester Blocks According to one embodiment, the silyl-containing polymer is a silyl-containing polyurethane (P2) having polyurethane-polyether and polyurethane-polyester blocks, said silyl-containing polyurethane (P2) being obtained by the following process:

a2) reaction of a mixture of alcohols comprising a polyether polyol (A2) with a stoechiometric excess of diisocyanate (B2), in order to form a polyurethane-polyether block (C2) having at least two terminal —NCO groups; then b2) reaction of the polyurethane (C2) obtained at the preceding step with a stoechiometric excess of a polyester polyol (D2), in order to form a polyurethane (E2) having polyurethane-polyether and polyurethane-polyester blocks comprising at least two terminal blocks consisting each in a polyurethane-polyester block having a terminal —OH group; then c2) reaction of the polyurethane (E2), having a terminal —OH group, of the preceding step with a stoechiometric quantity of an isocyanatosilane (F2).

Steps a1) and a2) in the Processes for Manufacturing (P1) and (P2) Respectively

Preferably, the polyether polyols (A1) and (A2) are selected from aliphatic and aromatic polyether polyols. More preferably, their mean molecular mass is ranging from 0.5 to 20 kDa and their hydroxyl functionality is ranging from 2 to 4.6. The hydroxyl functionality is the average number of hydroxyl functions per mole of polyether polyol.

By way of example of aliphatic polyether polyol (A1) and (A2), mention may be made of the oxyalkyl derivatives of:
- diols, such as ethylene glycol, propylene glycol, neopentyl glycol;
- triols, such as glycerol, trimethylolpropane, hexane-1,2,6-triol;
- tetrols, such as pentaerythritol.

Those products are commercially available.

According to one embodiment, the polyether polyol (A1) or (A2) are selected from polyethers deriving from the condensation of diol monomers or a mixture of polyethers deriving from the condensation of diol monomers with up to 30% by weight of polyethers deriving from the condensation of triol monomers.

According to one embodiment, the polyether polyol (A1) or (A2) is chosen from polypropylene glycols (PPG) having a hydroxyl functionality of 2 or 3, among which, mention may be made of:

Voranol® EP 1900: difunctional PPG having a molecular weight of about 3800 Da and a hydroxyl index $I_{OH}$ of 28 mg KOH/g;

Voranol® CP 755: trifunctional PPG having a molecular weight of about 700 Da and a hydroxyl index $I_{OH}$ of 237 mg KOH/g;

both available from Dow Company.

According to a preferred embodiment, the polyether polyol (A1) or (A2) is selected from polypropylene glycols having a degree of polymolecularity ranging from 1 to 1.4.

The degree of polymolecularity is the ratio between the weight average molecular mass and the number average molecular weight. Such polypropylene glycols are commercially available from Bayer Company under the trade name ACCLAIM®. By way of example, mention may be made of the trifunctional PPG ACCLAIM® 6300 having a molecular mass of about 6000 Da and an $I_{OH}$ of 28.3 mg KOH/g and of the difunctional PPG:

ACCLAIM® 8200 N having a number average molecular mass of 8000 Da and an $I_{OH}$ of 13.5 mg KOH/g, ACCLAIM® 12200 having a number average molecular mass of 12000 Da and an $I_{OH}$ of 10 mg KOH/g, ACCLAIM® 18200 having a number average molecular mass of 18000 Da and an $I_{OH}$ of 6.5 mg KOH/g.

The composition comprising the polyether polyol (A1) or (A2) used in the first step of polymerization a1) or a2) can further comprise one or more chain extenders selected from diols and polyamines having a molecular mass ranging from 60 to 500 Da.

By way of example of such diols, mention may be made of ethylene glycol, propylene glycol, diethylene glycol, dipropylene glycol, 3-methyl-1,5-propanediol, 1,4-butanediol, 1,6-hexanediol, 2-ethyl-1,3-hexanediol, N,N-bis(hydroxyl-2-propyl)aniline, 3-methyl-1,5-pentanediol.

By way of example of such polyamines, mention may be made of ethylene diamine, diphenyl methane diamine, isophorone diamine, hexamethylene diamine, diethyltoluene diamine.

The diisocyanate (B1) or (B2) used in the first step a1) or a2) of the process for making the polyurethane has the formula (IV):

$$NCO-R^7-NCO \quad (IV)$$

wherein $R^7$ represents an aliphatic or aromatic hydrocarbon divalent radical comprising from 5 to 15 carbon atoms, said radical can be linear, branched or cyclic.

According to one embodiment, $R^7$ is chosen from the following divalent radical, the formulas of which show the two free valency:

the divalent radical derived from isophorone:

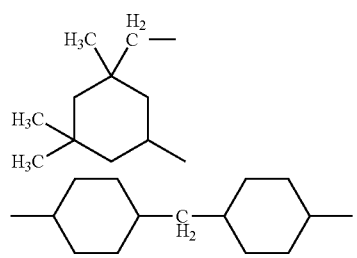

—(CH2)$_6$— (hexamethylene radical)

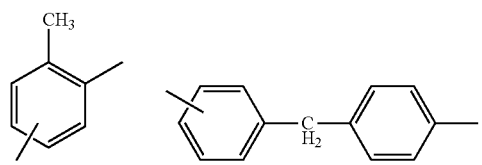

Such diisocyanates are commercially available.

A diisocyanate (B1) or (B2) of formula (IV) wherein $R^7$ is an aliphatic radical is preferred, isophorone diisocyanate (IPDI) is more particularly preferred.

During the first step a1) or a2) of the process, the polyether polyol (A1) or (A2) reacts with an excess of diisocyanate (B1) or (B2) of formula (IV); which means that the quantity of both reactants of step a1) or a2) corresponds to an excess of the equivalent number of —NCO groups (present in the quantity of diisocyanate) in comparison to the equivalent number of —OH groups (present in the quantity of polyether polyol) increased, if appropriate, by the equivalent number of —OH, —NH$_2$, and/or —NH groups present in the diol and/or the diamine used as chain extender.

Preferably, those quantities correspond to an equivalent ratio —NCO/OH ranging from 1.3 to 5. Said ratio is defined as being equal to the equivalent number of —NCO groups divided by the equivalent number of —OH, —NH$_2$, and/or —NH regarding functional groups brought by the corresponding quantities of both reactants, which are the diisocyanate on one hand and the other the mixture of polyether polyols comprising, if appropriate, a chain extender. The quantities by weight of the reactants to be fed into the reactor are determined on the basis of this ratio, as well as, regarding the polyether polyols, on the hydroxyl index $I_{OH}$. The hydroxyl index $I_{OH}$ is the number of hydroxyl functions per gram of polyether polyol, said number being expressed, in particular in the present application, in the form of the equivalent number of milligrams of KOH used in the dosage of hydroxyl functions.

When the diisocyanate (B1) or (B2) is an aliphatic diisocyanate, the step a1) or a2) is preferably carried out in the presence of a catalyst, preferably chosen from organometallic salts such as organometallic salts or complexes of lead, cobalt, iron, nickel, titanium, bismuth, zinc, tin, such as for example dibutyltin dilaurate (DBTL), titanium tetraisopropylate or bismuth/zinc carboxylates.

The appropriate quantity of diisocyanate (B1) or (B2) is introduced into the appropriate quantity of polyether polyol (A1) or (A2) which is previously fed into the reactor of step a1) or a2), said step being preferably performed at a temperature from 50° C. to 100° C.

Step b1) in the Process for Manufacturing (P1)

According to step b1), the polyurethane (C1) obtained from step a1) reacts with an alpha, beta or gamma aminosilane (D1) of formula (V):

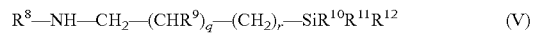

wherein:

$R^8$ and $R^9$, identical or different, represent a hydrogen atom or a C1-C10 aliphatic or aromatic hydrocarbon radical which can be linear, branched or cyclic;

$R^{10}$ represents a C1-C10 alkyl radical, linear or branched or has the same definition as $R^{11}$ or $R^{12}$;

$R^{11}$ and $R^{12}$, identical or different, represent a C1-C8 linear or branched alkoxy radical or a C1-C8 acyloxy radical;

q and r, identical or different, are equal to 0 or 1.

Preferably, an aminosilane (D1) of alpha type (corresponding to q=r=0) or of gamma type (corresponding to q=r=1) is used, because of its commercial availability.

Preferably, an aminosilane (D1) of formula (V) is used, wherein:

$R^8$ represents a hydrogen atom or a C1-C6 alkyl radical or a C3-C6 cycloalkyl;

$R^9$ represents a hydrogen atom;

$R^{10}$ represents a group chosen from: methyl, ethyl, methoxy, ethoxy; and $R^{11}$ and $R^{12}$ represent a methoxy or an ethoxy group.

By way of example, mention may be made of:

alpha-aminosilane having the formula (VII):

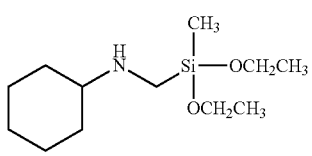

having a molar mass of 245.5 g, available from Wacker Chemie AG Company under the trader name Geniosil® XL 924;

alpha-aminosilane having the formula (VIII):

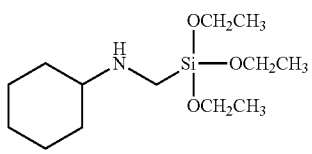

having a molar mass of 275.5 g, available from Wacker Chemie AG Company under the trade name Geniosil® XL 926;

gamma-aminosilane having the formula: nBu-NH—$(CH_2)_3$—$Si(OMe)_3$, having a molar mass of 235 g, available from Evonik Degussa Company under the trade name Dynasylan® 1189;

gamma-aminosilane having the formula: $NH_2$—$(CH_2)_3$—$Si(OMe)_3$ having a molar mass of 179.3 g, available from Momentive Company under the trade name Silquest® A-1110;

gamma-aminosilane having the formula: NH2-$(CH_2)_3$—$Si(OEt)_3$ having a molar mass of 221.1 g, available from Momentive Company under the trade name Silquest® A1100.

According to a preferred embodiment, the aminosilane (D1) is a gamma-aminosilane (corresponding to q=r=1 in formula (V)).

Preferably, a gamma-aminosilane of formula (V) wherein $R^{10}$, $R^{11}$ and $R^{12}$ each represent an ethoxy group is used for the improved stability to moisture of the corresponding silyl-containing polyurethane (P1).

Advantageously, the quantity of aminosilane (D1) which reacts with the polyurethane (C1) obtained from step a1) corresponds to an equivalent ratio of mole number —NCO/mole number of (D1) ranging from 0.95 to 1.

Practically, the corresponding quantity of aminosilane (D1) introduced into the reactor is calculated from the mole number of —NCO groups comprised in the polyurethane (C1) obtained from step a1). This number, which is calculated and/or determined by analysis of the polyurethane (C1), comprises terminal —NCO groups of the polyurethane (C1) and the —NCO groups of isocyanate monomer (B1) which have not reacted at step a1). The excess of aminosilane (D1) ensures the reaction of all the NCO functions present in the products present during step a1), including the functions of isocyanate monomers (B1) having not reacted during the polycondensation reaction of step a1).

Preferably, step b1) is performed at a temperature ranging from 40 to 100° C.

At the end of step b1), the silyl-terminated polyurethane (P1) is obtained.

Step b2) in the Process for Manufacturing (P2)

The polyurethane-polyether block (C2) having —NCO terminal groups obtained at the end of step a2) reacts with a polyester polyol (D2), according to step b2) of the process.

The polyester polyols (D2) are chosen from aliphatic or aromatic polyester polyols, and mixtures thereof. Preferably, their average molecular mass is ranged from 1 to 10 kDa, more preferably from 2 to 6 kDa, and their hydroxyl functionality can vary from 2 to 4.

By way of example, mention may be made of:

polyester polyols of natural origin such as castor oil;

polyester polyols resulting from condensation:

of one or more aliphatic (linear, branched or cyclic) or aromatic polyols such as ethanediol, 1,2-propanediol, 1,3-propanediol, glycerol, trimethylolpropane, 1,6-hexanediol, 1,2,6-hexanetriol, butenediol, sucrose, glucose, sorbitol, pentaerythritol, mannitol, triethanolamine, N-methyldiethanolamine and mixtures thereof, with one or more polycarboxylic acid or its ester or anhydride derivative such as 1,6-hexanedioic acid, dodecanedioic acid, azelaic acid, sebacic acid, adipic acid, 1,18-octadecanedioic acid, phthalic acid, succinic acid, and mixtures of those acids, a unsaturated anhydride such as maleic or phthalic anhydride, or a lactone such as caprolactone.

Many of those products are commercially available.

Among the polyester polyol (D2) that can be used in the process for manufacturing (P2), mention may be made of the following products having a hydroxyl functionality equal to 2:

KURARAY® Polyol P-1010, available from Kuraray Company, which derives from condensation of adipic acid and 6-methyl-1,5-pentyl diol having a molecular weight of 1000 Da, a hydroxyl number of 112, and being liquid at room temperature, TONE® 0240 (available from Union Carbide) which is a polycaprolactone having a molecular weight of about 2000 Da, an $I_{OH}$ equal to 56, and a melting point of about 50° C., DYNACOLL® 7381 having a molecular weight of about 3500 Da, an $I_{OH}$ equal to 30, and a melting point of about 65° C., DYNACOLL® 7360 which derives from condensation of adipic acid with hexanediol, a molecular weight of about 3500 Da, an $I_{OH}$ equal to 30, and a melting point of about 55° C., DYNACOLL® 7330 having a molecular weight of about 3500 Da, an $I_{OH}$ equal to 30, and a melting point of about 85° C., DYNACOLL® 7363 which derives from condensation of adipic acid with hexanediol, having a molecular weight of about 5500 Da, an $I_{OH}$ equal to 21 and a melting point of about 57° C., DYNACOLL® products are available from EVONIK Company.

Preferably, the polyester polyol (D2) used is a polycaprolactone, castor oil or a polyester polyol resulting from the condensation of ethanediol, 1,3-propanediol and/or 1,6-hexanediol with the adipic acid and/or phthalic acid.

Preferably, the polyester polyol used in step b2) has a —OH functionality ranging from 2 to 3, a functionality of 2 being particularly preferred.

During step b2), the polyurethane (C2) reacts with an excess of polyester polyol (D2) in term of equivalent functional groups. Preferably, the reactant quantities correspond to an —NCO/—OH equivalent ratio ranging from 0.10 to 0.80, said equivalent ratio being defined as previously. The quantities by weight of reactants to be fed into the reactor are determined on the basis of this ratio, as well as, regarding polyester polyol, on their hydroxyl index $I_{OH}$ whose definition is identical, mutatis mutandis, to the definition previously given for the polyether polyols.

Preferably, the polyester polyol used in step b2) has a melting point superior or equal to 55° C., corresponding to a significant crystallinity. In such a way, the "green strength" of the polyurethane obtained in the end is improved.

Preferably, for step b2), the appropriate quantity of polyester polyol (D2) is introduced into the appropriate quantity of polyurethane (C2) previously fed into the reactor. The reaction is preferably carried out at a temperature from 70 to 110° C.

Step c2) in the Process for Manufacturing (P2)

According to step c2), the polyurethane (E2) having —OH terminal groups obtained in the end of step b2) reacts with an isocyanatosilane (F2) of formula (VI):

$$NCO-R^3-Si(R^4)_p(OR^5)_{3-p} \qquad (VI)$$

wherein:
R$^3$ represents a linear alkylene divalent radical comprising from 1 to 3 carbon atoms;
R$^4$ and R$^5$, which are identical or different, each represent a linear or branched alkyl radical having 1 to 4 carbon atoms, with the possibility, when there are several R$^4$ (or R$^5$) radicals, that these radicals are identical or different;
p is an integer equal to 0, 1 or 2.

The isocyanatosilane of formula (VI) are commercially available. Mention may be made for example of the gamma-isocyanato-n-propyl-trimethoxysilane available under the trade name Geniosil® GF 40 or the alpha-isocyanato-methyl-dimethoxymethylsilane available under the trade name Geniosil® XL-42, both available from Wacker Company.

Preferably, the quantities of isocyanatosilane (F2) and of polyurethane having —OH terminal groups (E2) implemented during step c2) correspond to an equivalent ratio —NCO/—OH ranged from 0.95 to 1.05. Preferably, step c2) is conducted at a temperature of about 100° C.

At the end of step c2), the silyl-containing polyurethane (P2) is obtained.

Tackifying Resin

As regards the tackifying resin(s) which are included in the adhesive composition, the expression "compatible tackifying resin" means a tackifying resin which, when it is mixed in 50%/50% by weight proportions with the silyl-containing polymer gives a substantially homogeneous blend.

According to one embodiment, the tackifying resin has a softening point inferior or equal to 150° C., preferably inferior or equal to 130° C., more preferably inferior or equal to 120° C.

According to one embodiment of the invention, the tackifying resin is chosen from:
(i) phenol modified terpene resins,
(ii) hydrocarbon resins,
(iii) rosin ester resins, and
(iv) acrylic resins.

According to one embodiment, phenol modified terpene resins have a softening point from 110° C. to 130° C.

According to one embodiment, the hydrocarbon resins have a softening point from 70 to 120° C.

According to one embodiment, the rosin ester resins have a softening point from 90 to 110° C.

The softening point of the silyl-containing polymer and/or of the tackifying resin can be measured according to ASTM E28 standard.

According to one embodiment, phenol modified terpene resins are obtained by polymerization of terpene hydrocarbons and phenols, in the presence of Friedel-Crafts catalysts.

According to one embodiment, hydrocarbon resins are selected from:
resins obtained by a process comprising the polymerization of [alpha]-methyl-styrene, said process possibly also including a reaction with phenols,
resins obtained by hydrogenation, polymerization or copolymerization (with an aromatic hydrocarbon) of mixtures of unsaturated aliphatic hydrocarbons having around 5, 9 or 10 carbon atoms derived from petroleum fractions, optionally grafted with maleic anhydride,
terpene resins, generally resulting from the polymerization of terpene hydrocarbons such as, for example, monoterpene (or pinene) in the presence of Friedel-Crafts catalysts,
copolymers based on natural terpenes, for example styrene/terpene, [alpha]-methylstyrene/terpene and vinyltoluene/terpene.

According to one embodiment, rosin ester resins are selected from natural or modified rosins, such as for example the rosin extracted from pine gum, wood rosin extracted from tree roots and their derivatives that are hydrogenated, dimerized, polymerized or esterified by monoalcohols or polyols such as glycerol.

According to one embodiment, the molecular weight of a non acrylic resin i), ii) or iii) as above-disclosed is inferior or equal to 10,000 Da, preferably inferior or equal to 2,000 Da, more preferably inferior or equal to 1,000 Da.

An acrylic resin is defined as a polymer or oligomer built with a significant amount of (meth)acrylic and/or (meth) acrylate monomers, preferably at least 5% weight/weight (w/w), more preferably at least 10% w/w, still more preferably at least 20% w/w, still more preferably at least 30% w/w in the polymeric chain.

According to one embodiment (meth)acrylic monomers are chosen from acrylic acid, methacrylic acid, methyl acrylate, methyl methacrylate, ethyl acrylate, ethyl methacrylate, butyl acrylate, butyl methacrylate, isobutyl acrylate, isobutyl methacrylate, n-hexyl acrylate, n-hexyl methacrylate, 2-ethylhexyl acrylate, ethylhexyl methacrylate, n-heptyl acrylate, n-heptyl methacrylate, stearyl acrylate, stearylmethacrylate, glycidyl methacrylate, alkyl crotonates, vinyl acetate, di-n-butyl maleate, di-octylmaleate, acetoacetoxyethyl methacrylate, acetoacetoxyethyl acrylate, acetoacetoxypropyl methacrylate, acetoacetoxypropyl acrylate, diacetone acrylamide, acrylamide, methacrylamide, hydroxyethyl methacrylate, hydroxyethyl acrylate, allyl methacrylate, tetrahydrofurfuryl methacrylate, tetrahydrofurfuryl acrylate, cyclohexylmethacrylate, cyclohexyl acrylate, n-hexyl acrylate, n-hexyl methacrylate, 2-ethoxyethyl acrylate, 2-ethoxyethyl methacrylate, isodecyl methacrylate, isodecyl acrylate, 2-methoxy acrylate, 2-methoxy methacrylate, 2-(2-ethoxyethoxy) ethylacrylate, 2-phenoxyethyl acrylate, 2-phenoxyethyl methacrylate, isobornyl acrylate, isobornyl methacrylate, caprolactone acrylate, caprolactone methacrylate, polypropyleneglycol monoacrylate, polypropyleneglycol monomethacrylate, poyethyleneglycol(400) acrylate, polypropyleneglycol(400) methacrylate, benzyl acrylate, benzylmethacrylate, N-vinyl pyrrolidone or N-vinyl lactam.

Preferably, (meth)acrylic monomers have up to 20 carbon atoms, more preferably, (meth)acrylic monomers are chosen from acrylic acid, methacrylic acid, butyl acrylate, 2-ethylhexyl acrylate and hydroxyethylacrylate.

According to one embodiment, acrylic resins are selected from polymers containing at least one (meth)acrylic function or chain part and at least one hydrocarbon chain part, said polymers can be in the form of copolymers, grafted or reacted or block polymers.

Those resins have a viscosity measured at 100° C. significantly superior or equal to 100 Pa·s, and inferior or equal to 100 Pa·s at 150° C. Resins of type (iv) can comprise repeating units of at least one hydrocarbon monomer and at least one acrylate monomer. Hydrocarbon monomers are selected from the group consisting of styrene, alpha-methyl styrene, vinyl toluene, indene, methylindene, divinylbenzene, dicyclopentadiene, and methyl-dicyclopentadiene, and polymerizable monomers contained in C5-pyperylenic and C5-isoprene and C9-aromatic available streams from the petrochemical industry. Those hydrocarbon monomers are usually polymerized together in various ratios by cationic polymerization using lewis acid catalysts. Acrylate monomers have the general formula Ra—CH═CRb—COORc wherein Ra, Rb, Rc are selected independantly from each other from the group consisting of hydrogen, aliphatic groups, and aromatic groups. Acrylate monomers are selected from the group consisting of methyl acrylate, acrylic acid, methacrylic acid, methylmethacrylate, ethyl acrylate, ethylmethacrylate, butyl acrylate, butylmethacrylate, isobutyl acrylate, isobutylmethacrylate, n-hexyl acrylate, n-hexylmethacrylate, ethylhexyl acrylate, ethylhexyl methacrylate, n-heptyl acrylate, n-heptyl methacrylate, 2-methyl heptyl(meth)acrylate, octyl acrylate, octyl methacrylate, isooctyl(meth)acrylate, n-nonyl(meth)acrylate, isononyl(meth)acrylate, decyl(meth)acrylate, isodecyl acrylate, isodecyl methacrylate, dodecyl(meth)acrylate, isobornyl (meth)acrylate, lauryl methacrylate, lauryl acrylate, tridecyl acrylate, tridecyl methacrylate, stearyl acrylate, stearylmethacrylate, glycidylmethacrylate, alkyl crotonates, vinyl acetate, di-n-butylmaleate, di-octylmaleate, acetoacetoxyethyl methacrylate, acetoacetoxyethyl acrylate, acetoacetoxypropyl methacrylate, acetoacetoxypropyl acrylate, diacetone acrylamide, acrylamide, methacrylamide, hydroxyethylmethacrylate, hydroxyethyl acrylate, allyl methacrylate, tetrahydrofurfuryl methacrylate, tetrahydrofurfuryl acrylate, cyclohexyl methacrylate, cyclohexyl acrylate, n-hexyl acrylate, n-hexyl methacrylate, 2-ethoxyethyl acrylate, 2-ethoxyethyl methacrylate, isodecyl methacrylate, isodecyl acrylate, 2-methoxy acrylate, 2-methoxy methacrylate, 2-(2-ethoxyethoxy)ethylacrylate, 2-phenoxyethyl acrylate, 2-phenoxyethyl methacrylate, isobornyl acrylate, isobornyl methacrylate, caprolactone acrylate, caprolactone methacrylate, polypropyleneglycol monoacrylate, polypropyleneglycol monomethacrylate, poyethyleneglycol(400) acrylate, polypropyleneglycol(400) methacrylate, benzyl acrylate, benzylmethacrylate, sodium 1-allyloxy-2-hydroylpropyl sulfonate, acrylonitrile, and mixtures thereof.

Preferably hydrocarbon monomers are selected among the group of aromatic monomers or polymerizable monomers from the C9-aromatic stream from petrochemical sources; of dicyclopentadiene or polymerizable monomers from the C5-pyperylene or C5-isoprene stream from petrochemical sources.

Preferably acrylate monomers are acrylic acid and 2-ethylhexyl acrylate, hydroxyethylacrylate, methacrylic acid, butyl acrylate. Softening point of such resins are preferably from room temperature up to 180° C., molecular weights range in weight average is preferably from 200 to 25000 Daltons, and acid number preferably ranging from 0 to 300 mg KOH/g. Preferred resins would have molecular weight inferior or equal to 10,000 Daltons, more preferably inferior or equal to 2,000 Da, most preferably inferior or equal to 1,000 Da; softening point inferior or equal to 150° C., more preferably inferior or equal to 120° C., most preferably ranging from 70 to 120° C.; acid number inferior or equal to 150 mg KOH/g, more preferably inferior or equal to 100 mg KOH/g, most preferably from 10 to 100 mg KOH/g.

According to one embodiment, the molecular weight of an acrylic resin is inferior or equal to 300,000 when only one resin is present in the adhesive composition, preferably inferior or equal to 100,000, most preferably inferior or equal to 20,000.

A non-acrylic resin can still contain some acrylic functions in a non-significant quantity, either being part of the polymerization chemical reaction, or as grafted or functionalized groups onto monomers or onto the polymeric chains.

Such resins are commercially available or described in literature; for example, mention may be made of the following products:

resins of type (i): DERTOPHENE® 1510 available from DRT that has a molecular weight Mn of around 870 Da; DERTOPHENE® H150 available from DRT company with a molecular weight Mn equal to around 630 Da, DERTOPHENE® T having a molecular weight equal to around 500 Da available from the same company; SYLVAREZ® TP2040HME available from Arizona Chemical; SYLVAREZ® TP 95 available from Arizona Chemical having a molecular weight Mn of around 1200 Da;

resins of type (ii): NORSOLENE® W110 available from Cray Valley, which is obtained by polymerization of alpha-methylstyrene without the action of phenols, with a number-average molecular weight of 1000 Da, and a softening point of 110° C., NORSOLENE® W80 is of the same structure as NORSOLENE® W110 but with a lower molecular weight leading to a softening point of 80° C.;

resins of type (iii): SYLVALITE® RE 100 which is a pentaerythritol rosin ester available from Arizona Chemical and having a molecular weight Mn of around 1700 Da, resins of type (iv):
- KOLON® PX95 (available from Kolon Industries Inc.) or resin described in U.S. Pat. No. 7,332,540 (formulation 1, table 3 column 14), which are polymers containing at least one (meth)acrylic function or chain part and at least one hydrocarbon chain part, said polymers can be in the form of copolymers, grafted or reacted or block polymers,
- Acronal® 4F available from the BASF Company, Germany, resulting from polymerization of butyl acrylate monomers,
- AcResin® DS3500 available from BASF Company, Germany, resulting from (co)polymerization of butyl acrylate and acrylic acid monomers.

Catalyst

The curing catalyst that can be used in the composition may be any catalyst known to a person skilled in the art for silanol condensation. Mention may be made, as examples of such catalysts, of organic derivatives of titanium such as titanium acetyl acetonate (commercially available under the name TYZOR® AA75 from DuPont), of aluminium such as aluminium chelate (commercially available under the name K-KAT® 5218 from King Industries), of amines such as 1,8-diazobicyclo[5.4.0]undec-7-ene or DBU.

Other Components

Optionally, the adhesive composition may also include, in combination with the silyl-containing polymer, thermoplastic polymers often used in the preparation of HMPSAs, such as ethylene vinyl acetate (EVA) or styrene block copolymers.

The curable adhesive composition may also comprise up to 3% of a hydrolysable alkoxysilane derivative, as a desiccant, and preferably a trimethoxysilane derivative. Such an agent advantageously prolongs the shelf life of the composition during storage and transport, before the use thereof. Mention may be made, for example, of [gamma]-methacryloxypropyltrimethoxysilane available under the trade name SILQUEST® A-174 from US Momentive Performance Materials Inc.

The adhesive composition may also include a plasticizer such as a phthalate like diisononylphthalate (DINP) or a benzoate, a paraffinic and naphthenic oil (such as PRIMOL® 352 from Esso) or else a wax of a polyethylene homopolymer (such as A-C® 617 from Honeywell) or a wax of a polyethylene/vinyl acetate copolymer, or else pigments, dyes or fillers.

Preferably, the adhesive composition comprises less than 30% by weight of fillers, preferably less than 20% by weight of fillers, more preferably less than 10% by weight of fillers, still more preferably less than 5% of fillers.

Among fillers that can be used in the adhesive composition, mention may be made of mineral fillers such as calcium carbonate, magnesium carbonate, sand, alumina, hydrated alumina, magnesium silicate, aluminium silicate, sodium silicate, potassium silicate, mica and silica.

Finally, an amount of 0.1 to 3% of one or more stabilizers (or antioxidants) is preferably included in the composition. These compounds are introduced to protect the composition from degradation resulting from a reaction with oxygen which is capable of being formed by action of heat or light. These compounds may include primary antioxidants which trap free radicals and are, in particular, substituted phenols such as IRGANOX® 1076 or IRGANOX® 1010 from Ciba. The primary antioxidants may be used alone or in combination with other secondary antioxidants or UV stabilizers.

The adhesive composition may be prepared by a process which comprises:
- a step of mixing in an air-free environment, preferably under an inert atmosphere, the silyl-containing polymer with the tackifying resin(s), at a temperature from 50 to 170° C., preferably from 100 to 170° C.; then
- a step of cooling said mixture to a temperature ranging from 50 to 90° C., and advantageously of around 70° C.; then
- a step of incorporating a catalyst into said mixture and, where appropriate, desiccant and other optional components.

By "substrate" or "carrier" it is to be understood a support layer at least a part of which is coated by the adhesive composition in the self-adhesive article. The substrate may have any shape, but comprises at least one face which is approximately flat, on which the adhesive layer is coated and which can be applied to a surface for bonding thereupon. The substrate may have two identical or different faces, with identical or different chemical natures and/or identical or different mechanical properties, in order to be adapted to many self-adhesive article shapes according to their final applications.

The substrate may be based on any kind of materials that can be used according to the need for making PSA articles, such as tape or label articles. For example, polypropylene, polyethylene and paper are base stock material for such substrate, as well as any useful plastic or fibrous web that can be handled through such articles; fabric, metal fiber or glass fiber based materials can also be used for some applications. According to one embodiment of the invention, the substrate is a carrier based on polyethylene terephthalate (PET), polypropylene (PP) or polyurethane (PU).

According to one embodiment, one side of the substrate sticks to the adhesive layer (front side) and the other side is further covered with a non-sticking layer, for example a layer made in a siliconized material (back side). In this case, the self-adhesive article obtained can be easily reeled thanks to the presence of a non-sticking layer onto the back side of the substrate. Said non-sticking layer does not adhere to the adhesive layer, such that there is no adhesive transfer between the non-sticking layer and the adhesive layer. According to another embodiment, one side (back side) of the substrate is treated in order to be non-sticking. Said substrate presents the same advantage as the substrate covered with a non-sticking layer.

According to one embodiment, the substrate is a grid or a mesh or a non-woven material. In this case, the adhesive layer may be present onto one surface of the substrate, but can also penetrate inside the substrate during its application because of the porous nature of the substrate so that the fibers of which the substrate is made are entirely coated by the adhesive composition. In this case, a release liner is preferably present onto the adhesive layer or adhesive composition.

According to another embodiment, the substrate is a release liner. The release liner is intended to be removed before application onto a surface for adhering thereupon. Preferably, the release liner (also called a protective non-sticking layer) is made of siliconized film or paper, for example said layer consists in a cross-linked polydimethylsiloxane-based material. According to one embodiment, the release liner may have two different surfaces; said surfaces may be made with two different materials. According to one embodiment, the self-adhesive article comprises only a release liner as substrate, and in this case, once the adhesive article has been applied, it does not comprise any substrate any more. A tape made according to said configuration is commonly called "transfer tape".

According to one embodiment, the substrate is coated on both sides with the same or two different adhesive compositions, at least one adhesive composition being according to the present invention.

Also, the substrate can be pre-treated by any technique, like plasma, corona treatments, or abrased, or pre-coated, to modify surface tensions or in general to help with any of features to be given to the finished assembly.

Examples of such materials are prepared from:
Estane™ 58309NAT022 polyurethane materials (B.F. Goodrich, Cleveland, Ohio),
Rucothane™ polyurethane or HytreFM 4056 elastomeric polyester (DuPont, Wilmington, Del.),
Pebax™ 2533 or 3533 polyether block amide (Arkema, Paris, France).

Preferably, the coating of the adhesive composition on the substrate is continuous or quasi-continuous.

The self-adhesive article may be made by a process comprising the steps of:
(a) conditioning the adhesive composition as previously defined at a temperature from 20 to 160° C.; then
(b) coating the adhesive composition obtained at step a) onto a carrying surface; then (c) curing the coated adhesive composition, by heating the coated carrying surface at a temperature from 20 to 200° C. optionally, (d) laminating the cured adhesive layer onto a substrate.

The step (b) of coating the carrying surface is carried out using known coating devices, such as for example a lipped die or a curtain-coating type die, or else a roll. It employs a weight per unit area of adhesive composition ranging from 3 to 2000 g/m², preferably from 5 to 500 g/m², more preferably from 10 to 250 g/m².

The carrying surface is adapted to carry the adhesive composition. The carrying surface can be a release liner or a carrier film or web.

According to one embodiment, the carrying surface is a siliconized surface.

Preferably, the coating is continuous or almost continuous.

According to one embodiment, the coated adhesive composition is further submitted to a treatment step in a humid atmosphere characterized by its humidity level. Preferably, the humid atmosphere is an atmosphere in which from 5 to 100% of the molecules are water molecules, preferably from 10% to 90%, more preferably from 15% to 70% of the molecules are water molecules.

The time needed for the curing of step (c) may vary to a large extent, for example from 1 second to 10 minutes, depending on the weight per unit area of adhesive composition deposited on the substrate, on the heating temperature and on the humidity.

This curing step has the effect of creating between the polymer chains and under the action of atmospheric moisture, siloxane-type bonds which result in the formation of a three-dimensional polymer network. The thus cured adhesive composition is a pressure-sensitive adhesive layer which gives the substrate that is coated therewith desirable adhesive strength and tack.

Preferably, the coating is made uniformly onto the substrate or the non-sticking support but the coating can also be adapted to the desired shape of the final article.

According to one embodiment, the coating of the adhesive composition is performed onto at least a part of both sides of the substrate. If both sides of the substrate are coated, the adhesive composition may be the same or different on both sides, and the coating weight can be the same or different on both sides.

According to another embodiment of the invention, the self-adhesive article comprises an adhesive layer on at least a part of one or both sides of the substrate, said adhesive layer(s) being optionally covered with a release liner. According to one embodiment, the self-adhesive article comprises two release liners surrounding the adhesive composition. In this case, both release liners can be made of similar or different materials and/or they can have the same or different thicknesses.

Another object of this invention is a method for bonding a self-adhesive article comprising at least one substrate and an adhesive layer onto a surface, said adhesive layer being obtained by curing the adhesive composition as disclosed in the present invention, said method comprising the steps of:

a) removing the protective non-sticking layer when said layer is present;

b) applying the article onto the surface; and c) applying a pressure onto the article;

wherein at least one of steps a), b) or c) is carried out in a wet environment or wherein the method includes an additional step d) of contacting the surface bonded with the article with a wet environment.

According to one embodiment of the invention, all the steps of the process according to the invention are carried out in a wet environment.

According to one embodiment, the protective non-sticking layer is removed outside the wet environment.

According to one embodiment, steps a), b) and c) are performed outside the wet environment and then, the surface bonded with the adhesive article is placed in a wet environment.

Preferably, in the method of the invention, applying a pressure onto the article substantially removes any water and/or air molecules which are trapped between the surface and the adhesive layer of the article.

Removing any water and/or air molecules which are trapped between the surface and the adhesive layer of the article can be performed by any know methods in the art. In a known manner, the skilled person can smooth the adhesive layer onto the surface to be bonded, for example by using any known means, such as the hand or a blade.

According to one embodiment of the invention, the bonding is characterized by a peel strength which does not decrease with the passage of time. According to one embodiment, the peel strength increases with the passage of time.

The method of the invention may be carried out according to any one of the conditions previously described.

The bonding according to the invention is characterized by a peel strength which does not decrease with the passage of time, preferably which increases with the passage of time. For example, the peel strength does not decrease with the passage of immersion time, preferably, the peel strength increases with the passage of immersion time.

EXAMPLES

Example 1 (According To The Invention)

A self-adhesive article comprising an adhesive layer obtained from a composition comprising:

53.7% by weight of silyl-containing polymer of type P4,
44.7% by weight of tackifying resin DERTOPHENE® H150,
1.1% by weight of catalyst K-KAT® 5218 and
0.8% by weight of stabilizers.

The silyl-containing polymer of type P4 used in the adhesive composition of example 1 is prepared according to the following process:

Into a glass reactor are introduced:

961.2 g (0.1165 mol) of the polyisopropoxy diol ACCLAIM® 8200, 12.99 g (0.0582 mol) of isophorone diisocyanate (IPDI), which corresponds to a ratio of the numbers of NCO/OH functional groups equal to 0.5; and 120 ppm of a catalyst of bismuth/zinc neodecanoate type (commercially available from Borchers, under the name Borchi Kat VP 0244).

This mixture is kept under constant stirring at 85° C. and under nitrogen for 3 hours, until complete reaction of the NCO functional groups of the IPDI.

Then, 24.6 g (0.1165 mol) of [gamma]-isocyanato-n-propyltrimethoxysilane are added to the hydroxyl-terminated polyurethane thus obtained and the mixture is kept at 85° C. until complete disappearance of the NCO functional groups.

The silyl-containing polymer of type P4 obtained has a viscosity of 55 Pa·s (measured using a Brookfield viscometer at 23° C., with a No. 7 spindle turning at a rate of 20 rpm), a number-average molecular weight of around 20 kDa and a polydispersity index of around 1.3.

Example 2 (Comparative)

Hot-melt pressure-sensitive adhesive article (HMPSA). The HMPSA article comprises an adhesive layer obtained from a HMPSA composition comprising:
- 33% by weight of SIS copolymer having a styrene content comprised between 18% to 21% and a diblock content greater than 30%,
- 48% by weight of pentaerythritol rosin ester having a ring-and-ball softening point around 100° C.,
- 18% by weight mineral naphtenic oil,
- 1% by weight of stabilizers.

The HMPSA composition of Example 2 is prepared by a simple mixture of its components in a batch or semi-batch mixer at a temperature comprised between 130 and 200° C. The mixing techniques are well known from one skilled in the art.

Example 3 (Comparative)

Solvent-based adhesive article comprising an adhesive layer obtained from an adhesive composition comprising 31.5% by weight of 2-ethylhexyl acrylate monomer, 2.1% by weight of acrylic acid, 1.4% by weight of melamine formaldehyde and 65% by weight of ethyl acetate.

2-ethylhexyl acrylate monomers, acrylic acid monomers, and melamine formaldehyde are available from Aldrich France.

The adhesive composition according to Example 3 is prepared according to the following process.

A polymerization reactor equipped with a heating jacket, nitrogen inlet valve, stirring mechanism, and reflux condenser was purged with nitrogen, the heating jacket was set to 80° C., and the initial solvent (ethyl acetate) charge was added, for about 70% of the total solvent quantity. The stirring mechanism was set to 125 round per minute. A monomer mixture was added in a small amount (around 15% of the whole monomer quantity) as the initial monomer charge, and mixed for ten minutes, and the content of the reactor was heated to reflux. After kick-off (70° C.) the batch was held for 15 minutes, with agitation. The monomer introduction was set at about 3g/minutes, and the batch temperature was maintained at 70-80° C. After the whole monomer feed was added, the reactor content was held for one hour, with agitation. The catalyst (melamine formaldehyde) was then added. Final charge of solvent was added to reach a calculated level of 35% polymer content into solvent, and the reactor contents were cooled and discharged.

Example 4 (Comparative)

DOW CORNING® 280A adhesive composition available from Dow Corning Company. The adhesive composition is characterized by a polydimethylsiloxane gum and resin dispersion. The adhesive composition is a solvent silicone-based pressure-sensitive adhesive.

Example 5 (Comparative)

UV-curable acrylic-based PSA article. Said article comprises an adhesive layer obtained from an adhesive composition comprising:
- 90% by weight of 2-ethylhexylacrylate,
- 7% by weight of acrylic acid,
- 1% by weight of hexanediol diacrylate (HDDA) as cross-linker,
- 1% by weight of stabilizer,
- 1% by weight of benzophenone as photoinitiator.

The adhesive composition is obtained by mixing the components. The viscosity measured at room temperature is around 6000 mPa·s.

Example 6 (According To The Invention)

A self-adhesive article comprising an adhesive layer obtained from an adhesive composition comprising:
- 51.2% by weight of silyl-containing polymer SPUR® 1050 MM commercially available from Momentive, of type P1,
- 46% by weight of tackifying resin DERTOPHENE® H150,
- 2% by weight of catalyst K-KAT® 5218 and
- 0.8% by weight of stabilizers.

Example 7 (According To The Invention)

A self-adhesive article comprising an adhesive layer obtained from an adhesive composition comprising:
- 51.2% by weight of silyl-containing polymer Desmoseal® XP 2636 commercially available from Bayer, of type P3, comprising about 2 silyl functions per molecule,
- 46% by weight of tackifying resin DERTOPHENE® H150,
- 2% by weight of catalyst K-KAT® 5218 and
- 0.8% by weight of stabilizers.

Example 8 (According To The Invention)

A self-adhesive article comprising an adhesive layer obtained from an adhesive composition comprising:
- 51.2% by weight of silyl-containing polymer of type P4 used in the adhesive composition of example 1,
- 32.2% by weight of tackifying resin Kolon® PX 95,
- 13.8% by weight of liquid tackifying resin AcResin® DS3500,
- 2% by weight of catalyst K-KAT® 5218 and
- 0.8% by weight of stabilizers.

The compositions of examples 1 to 8 are cured and laminated onto a substrate in order to obtain a self-adhesive article.

Lamination of the adhesive composition of Example 1, 6, 7 and 8: As the support layer, use is made of a rectangular sheet of polyethylene terephthalate (PET) having a thickness of 50 µm and dimensions of 20 cm by 40 cm. The adhesive composition previously obtained is preheated to a temperature close to 100° C. and introduced into a cartridge from which a bead is extruded which is deposited close to the edge of the sheet parallel to its width. The composition enclosed in this bead is then spread over the entire surface of the sheet, so as to obtain a uniform layer of substantially constant thickness. In order to do this a film spreader (also known as a film applicator) is used, which is moved from the edge of the sheet to the opposite edge. A layer of composition is thus deposited that corresponds to a weight per unit area of about 50 g/m². The exact values of coating weights are indicated in table 1. The PET sheet thus coated is then placed in an oven at 130° C. for 5 minutes for the curing of the composition. The sheet is then laminated to a protective non-stick layer consisting of a sheet of siliconized film that is rectangular and has the same dimensions.

Lamination of the adhesive composition of Example 2: the HMPSA composition is coated by a standard slot die coater at a temperature between 150° C. to 170° C. The adhesive is directly applied on a PET sheet having a thickness of 50 μm and then a calendered paper release liner is laminated onto.

Lamination of Examples 3 and 4: following polymerization, the wet adhesive was coated on a PET sheet having a thickness of 50 μm with the help of a Meier bar and a hand coater with controlled speed to get the target coating weight. Once the coating is done, it is stored in a ventilated area for 10 minutes at room temperature, and then dried at 120° C. for 5 minutes in a ventilated oven adapted to solvent based product. Then, a release liner is applied on the tacky surface as a protector. All laminates were stored for mimimum 1 week before testing in a climate room at 23° C. and 50% relative humidity. For example 4 a fluorinated release liner is chosen to avoid any interaction with the adhesive based on silicone.

Lamination of Example 5: after its preparation, the adhesive composition is coated with a doctor blade at 23° C. with a speed around 15 m/min onto a release liner (PET) having a thickness of about 50 μm.

After the lamination, the curing step is carried out using a UV radiation method. The UV bulbs are characterized by UVa having an intensity of around 18 mW/m² and enough UV bulbs to get a full curing at 50 g/m² at the end of the line.

Peel tests described below are carried out after conditioning the sample products in different conditions defined herein under:

"dry applied": for this test, the release liner is removed from the adhesive layer outside the wet environment and said adhesive layer is applied onto a surface (a glass plate for the tests) outside the wet environment. Then, the surface bonded with the adhesive layer is immersed under water for 20 minutes or 24 hours.

"wet applied": for this test, the self-adhesive article and the surface are immersed under water. The release liner is removed from the adhesive layer and said adhesive layer is immediately applied onto the surface, still under water. The surface bonded with the adhesive layer is left under water for 20 minutes or 24 hours.

"wet applied": for this test, the self-adhesive article and the surface are immersed under water. The release liner is removed from the adhesive layer under water and, before applying the adhesive layer onto the surface, we wait for 20 seconds, and then, said adhesive layer is applied onto the surface, still under water. The surface bonded with the adhesive layer is left under water for 20 minutes, 24 hours or 7 days.

The above-mentioned conditionings are carried out in natural water and in sea water. Sea water is prepared with a sea salt composition, Instant Ocean® from Aquarium System, having a salinity of 1.023.

The above-mentioned conditionings are carried out onto various surfaces: a glass plate, a HDPE (high density polyethylene) plate and an abrased stainless steel surface.

180° Peel Test on a Surface After Different Immersion Time:

The adhesive strength is evaluated by the 180° peel test on a surface as described in FINAT method No. 1 published in the FINAT Technical Manual, 6$^{th}$ edition, 2001. FINAT is the International Federation for Self-adhesive Label Manufacturers and Converters. The principle of this test is the following.

A test specimen in the form of a rectangular strip (25 mm×175 mm) is cut from the PET substrate coated with the cured composition obtained previously. This test specimen is, after the preparation thereof, stored at a temperature of 23° C. and a relative humidity of 50%, before being put in any one of the conditions previously described, "dry applied", "wet applied" or "wet wet applied". In the end of the conditioning (20 minutes, 24 hours or 7 days), the surface is removed from water without paying any particular attention to remove excess of water. The assembly, surface and adhesive layer, is then placed in a tensile testing machine capable, starting from the end of the rectangular strip that is left free, of peeling or debonding the strip at an angle of 180° and with a separation rate of 300 mm per minute. The machine measures the force required to debond the strip under these conditions.

The corresponding results are expressed in N/cm and are indicated in table 1 (immersion in natural water with glass plate as surface), in table 2 (immersion in sea water with glass plate as surface) and in table 3 (immersion in natural water with various surfaces); the coating weight is expressed in g/m².

Peel Tests in Natural Water on Glass Plate as Surface

TABLE 1

Results of the peel test in natural water on glass plate as surface (N/cm)

| examples | peel test (20 min) | | | peel test (24 h) | | | peel test (7 days) |
|---|---|---|---|---|---|---|---|
| | dry applied | wet applied | wet wet applied | dry applied | wet applied | wet wet applied | wet wet applied |
| 1 (g/m²) | 11.8 (52.8) | 4 (51.5) | 8.8 (54.3) | 10.9 (54) | 8.4 (53.6) | 8.8 (54.3) | 10.4 (57.2) |
| 2 (g/m²) | 12.3 (50) | 11.4 (50) | 11.4 (50) | 6.7 (50) | 3.2 (50) | 3.5 (50) | 2.8 (50) |
| 3 (g/m²) | 4.7 (51.8) | 0.6 (54) | 1.4 (48.3) | 2.2 (51.6) | 0.3 (50.4) | 0.08 (47.8) | 0.4 (49.5) |
| 4 (g/m²) | 6.4 (50) | 3.5 (50) | 3.2 (52.9) | 5.4 (50) | 1.8 (50) | 3.2 (52.9) | 4.5 (56.6) |
| 5 (g/m²) | 5.2 (50) | 1.4 (50) | 0.5 (50) | 1.7 (50) | 1.1 (50) | 0.5 (50) | 1.0 (50) |
| 6 (g/m²) | | | 0.8 (45.9) | | | 6.7 (53.2) | 16.8 (50.7) |
| 7 (g/m²) | | | 1.2 (67.1) | | | 4.1 (69.5) | 11.7 (67.9) |

TABLE 1-continued

Results of the peel test in natural water on glass plate as surface (N/cm)

| examples | peel test (20 min) | | | peel test (24 h) | | | peel test (7 days) |
| --- | --- | --- | --- | --- | --- | --- | --- |
| | dry applied | wet applied | wet wet applied | dry applied | wet applied | wet wet applied | wet wet applied |
| 8 (g/m²) | | | 1.2 (51.8) | | | 1.9 (54.8) | 3.1 (52.8) |

Table 1 shows that the adhesive composition of Example 1 (according to the invention) provides an adhesive article having a high peel strength, and overall a peel strength that does not decrease when the immersion time increases. Indeed, the peel strength in "wet wet applied" conditions increases with the passage of time, from 8.8 N/cm after 20 min to 10.4 after 7 days.

The adhesive compositions of examples 6 and 7 (according to the invention) provide an adhesive article having a peel strength which increases when immersion time increases within "wet wet applied" conditions, respectively from 0.8 N/cm after 20 min to 16.8 after 7 days and from 1.2 N/cm after 20 min to 11.7 N/cm after 7 days.

Table 1 shows that the peel strength of a hot-melt adhesive (Example 2) substantially decreases with the passage of time: from 11.4 N/cm after 20 min to 3.5 N/cm after 24 h and to 2.8 N/cm after 7 days in the "wet wet applied" conditions.

The peel strength of the adhesive composition according to Example 3 is relatively low and decreases with the passage of time. Moreover, this adhesive composition comprises significant amounts of solvent.

The peel strength of the adhesive composition according to Example 4 does not decrease with the passage of time in "wet wet applied" conditions but said composition comprises significant amounts of solvent, which is not satisfying from an environmental point of view.

Table 1 shows that the peel strength of the adhesive composition of Example 5 under "wet wet applied" conditions is less than 0.8 N/cm after 20 min and after 24 h. Those values are quite low for a self-adhesive article.

Compositions according to the invention do not comprise significant amounts of solvent and show a significant increase in peel strength when bonding is achieved in a natural water environment.

Peel Tests in Sea Water on Glass Plate as Surface

Table 2 shows test results for adhesive articles submitted to a "wet wet applied" conditioning in sea water on glass plate as surface.

TABLE 2

Results of the peel test in sea water on glass plate as surface (N/cm)

| examples | peel test (20 min) wet wet applied | peel test (24 h) wet wet applied | peel test (7 days) wet wet applied |
| --- | --- | --- | --- |
| 3 (g/m²) | 0.08 (56.3) | 0.5 (58.2) | 0.2 (59.2) |
| 4 (g/m²) | 0.6 (48.9) | 2 (50.1) | 2.8 (50.9) |
| 6 (g/m²) | 1 (48.9) | 8.4 (49.4) | 18.2 (57.6) |
| 7 (g/m²) | 2.8 (62.8) | 4.8 (65.3) | 8 (73.3) |

Table 2 shows that the adhesive compositions according to the invention (Examples 6 and 7) provide an adhesive article having a relatively high peel strength, and overall a peel strength that increases when the immersion time in sea water increases. The peel strength increases with immersion time: from 1 N/cm after 20 min to 18.2 N/cm after 7 days (Example 6) and from 2.8 N/cm after 20 min to 8 N/cm after 7 days (Example 7).

Table 2 shows that the peel strength of the adhesive composition of Example 3 under "wet wet applied" conditions in sea water is less than 0.8 N/cm after 20 min, after 24 h and after 7 days. Those values are quite low for a self-adhesive article.

The peel strength, after the conditioning in sea water, of the adhesive composition according to Example 4 is lower than the peel strength of the adhesive compositions according to the invention (Examples 6 and 7). Moreover, this adhesive composition of Example 4 comprises significant amounts of solvent.

Compositions according to the invention show a significant increase in peel strength when bonding is achieved in a sea water environment.

Peel Test in Natural Water and on Varied Surfaces

Another peel test using the adhesive composition of example 6 (according to the invention) is carried out by replacing the glass surface by another material, such as HDPE (high density polyethylene) and abrased stainless steel surfaces. A conditioning in natural water is achieved in the same conditions "wet wet applied" as above disclosed. The HDPE plate is available from Rocholl GMBH. The abrased stainless steel surface complies with the AFERA EN 1939 standard. The results are expressed in N/cm and are indicated in table 3.

TABLE 3

Peel test of adhesive composition of example 6 on other materials

| surfaces | Glass | HDPE | abrased stainless steel |
| --- | --- | --- | --- |
| Peel test (20 min) (g/m²) | 0.8 (45.9) | 4.2 (48.3) | 4 (50.1) |
| Peel test (24 h) (g/m²) | 6.7 (53.2) | 5.3 (55.6) | 8.2 (53.9) |
| Peel test (7 days) (g/m²) | 16.8 (50.7) | 4.6 (51.6) | 7.4 (52) |

Table 3 shows that the peel strength of the adhesive composition according to the invention increases from 4.2 N/cm after 20 min to 4.6 N/cm after 7 days of immersion of the bonded article on HDPE and from 4 N/cm after 20 min to 7.4 N/cm after 7 days of immersion of the bonded article on abrased stainless steel.

Peel strength of the article according to the invention globally increases with the passage of time, whatever the surface used when bonding is performed in an aqueous environment.

The invention claimed is:

1. A method comprising bonding at least one surface covered with a layer of aqueous medium of 1 μm or more to at least one article, said article comprising at least one substrate and an adhesive layer, wherein said adhesive layer is obtained by curing an adhesive composition comprising:
   a) from 20 to 85% by weight of at least one silyl-containing polymer selected from:
      i) a silyl-containing polyether having from 1.9 to 2.1 silyl functions per molecule,
      ii) a silyl-containing polyurethane,
      iii) a silyl-containing polyurethane having polyurethane-polyether and polyurethane-polyester blocks, and mixtures thereof,
   b) from 25 to 80% by weight of at least one compatible tackifying resin and
   c) from 0.01 to 3% by weight of at least one catalyst,
   d) less than 5% by weight of solvent,
   based on the total weight of the adhesive composition.

2. The method according to claim 1, wherein, at least 90% by weight of the silyl-containing polymer(s) are silyl-containing polyethers having from 1.9 to 2.1 silyl functions per molecule, silyl-containing polyurethanes, silyl-containing polyurethanes having polyurethane-polyether and polyurethane-polyester blocks, or mixtures thereof.

3. The method according to claim 1, wherein the tackifying resin is phenol modified terpene resins, hydrocarbon resins, rosin ester resins, acrylic resins or mixtures thereof.

4. The method according to claim 1, wherein the substrate is a protective non-sticking layer.

5. The method according to claim 4, wherein the substrate is a siliconized film.

6. The method according to claim 1, wherein the aqueous medium is water or body fluids.

7. The method according to claim 6, wherein the aqueous medium is sea water, rain water, sweat, saliva, blood, urine, feces or lymphatic film.

8. The method according to claim 1, wherein the surface covered with a layer of aqueous medium of 1 μm or more is a skin surface, a bathroom or kitchen equipment surface, a piping, a pipe, an aquatic article, a boat hull, a roof, a bridge, or a wall covering.

9. The method according to claim 1, comprising repairing objects, and/or preventing and/or repairing leaks, and/or reinforcing a surface of an object, and/or creating a multilayer article, and/or superposing layers in an adhesive manner.

10. The method according to claim 1, said method comprising:
    a) removing the protective non-sticking layer when said layer is present;
    b) applying the article onto the surface; and
    c) applying a pressure onto the article.

11. The method according to claim 10, wherein at least one of a), b) or c) is carried out under water.

12. The method according to claim 11, carried out under sea water.

13. The method according to claim 10, wherein the surface is a skin surface, a bathroom or kitchen equipment surface, a piping, a pipe, an aquatic article, a boat hull, a roof, a bridge, or a wall covering.

14. A method of repairing objects, and/or preventing and/or repairing leaks, and/or reinforcing a surface of an object, and/or creating a multilayer article, and/or superposing layers in an adhesive manner, wherein it includes a method according to claim 10.

15. The method according to claim 10, wherein applying the pressure onto the article substantially removes any water and/or air molecules which are trapped between the surface and the adhesive layer of the article.

16. The method according to claim 10, wherein the bonding. has a peel strength which does not decrease with the passage of time.

17. The method according to claim 16, wherein the bonding has a peel strength that increases with the passage of time.

* * * * *